(12) United States Patent
Hsu et al.

(10) Patent No.: US 8,628,244 B2
(45) Date of Patent: Jan. 14, 2014

(54) ANTI-INTERFERENCE STRUCTURE OF RELATIVE SLIDE ASSEMBLY

(75) Inventors: An Szu Hsu, New Taipei (TW); Chien Cheng Mai, New Taipei (TW); Way Han Dai, New Taipei (TW)

(73) Assignee: First Dome Corporation, New Taipei (TW)

( * ) Notice: Subject to any disclaimer, the term of this patent is extended or adjusted under 35 U.S.C. 154(b) by 317 days.

(21) Appl. No.: 13/214,312

(22) Filed: Aug. 22, 2011

(65) Prior Publication Data

US 2013/0047377 A1 Feb. 28, 2013

(51) Int. Cl.
*F16C 29/02* (2006.01)
*E05D 15/48* (2006.01)
*F16C 31/02* (2006.01)
*F16C 29/00* (2006.01)

(52) U.S. Cl.
CPC .................................... *F16C 29/001* (2013.01)
USPC ............................................... 384/26; 16/362

(58) Field of Classification Search
USPC ........ 384/7, 20–22, 24, 26, 129; 16/229, 246, 16/337, 362
See application file for complete search history.

(56) References Cited

U.S. PATENT DOCUMENTS

| | | | | |
|---|---|---|---|---|
| 2,136,141 | A * | 11/1938 | Loftin et al. | 16/337 |
| 2,880,452 | A * | 4/1959 | Forgach | 16/277 |
| 6,568,342 | B2 * | 5/2003 | Mielke et al. | 114/202 |
| 7,650,671 | B2 * | 1/2010 | Lee | 16/362 |
| 7,669,286 | B2 * | 3/2010 | Lu et al. | 16/340 |
| 7,725,988 | B2 * | 6/2010 | Kim et al. | 16/361 |
| 7,865,999 | B2 * | 1/2011 | Hilger | 16/49 |
| 7,975,348 | B2 * | 7/2011 | Lin | 384/20 |
| 2008/0052874 | A1 * | 3/2008 | Liu | 16/246 |
| 2009/0007383 | A1 * | 1/2009 | Lee | 16/362 |
| 2009/0169289 | A1 * | 7/2009 | Inoue et al. | 402/77 |
| 2009/0183340 | A1 * | 7/2009 | Chiang | 16/327 |
| 2009/0320244 | A1 * | 12/2009 | Lin | 16/362 |
| 2012/0175478 | A1 * | 7/2012 | Chen et al. | 248/286.1 |
| 2012/0236476 | A1 * | 9/2012 | Wu et al. | 361/679.01 |

* cited by examiner

*Primary Examiner* — Marcus Charles
(74) *Attorney, Agent, or Firm* — Rosenberg, Klein & Lee

(57) ABSTRACT

An anti-interference structure of relative slide assembly includes a relative slide member and a slide member. At least one guide member is disposed on the relative slide member. The guide member has a support section rising from a surface of the relative slide member. At least one guide slope is formed on one side of the support section. The slide member is relatively slidably connected with the relative slide member. At least one raised abutment section is disposed on the slide member and slidable with the slide member. The support section is positioned in the sliding path of the raised abutment section. During the sliding movement of the slide member along the relative slide member, the raised abutment section abuts against the support section to enlarge the gap between the slide member and the relative slide member so as to avoid interference therebetween due to deformation of the components.

8 Claims, 6 Drawing Sheets

ANTI-INTERFERENCE STRUCTURE OF RELATIVE SLIDE ASSEMBLY

BACKGROUND OF THE INVENTION

1. Field of the Invention

The present invention relates generally to an anti-interference structure of relative slide assembly, and more particularly to an anti-interference structure applicable to large-size slide mechanism to avoid interference between the components due to deformation and downward curvature of the slide member.

2. Description of the Related Art

Following the rapid development of electronic industries, various mobile devices (such as mobile phones, calculators, personal digital assistants (PDA) and mobile computers) have been more and more popularly used. These mobile devices are diversified in configuration and structure to provide convenient use for users. The slide cover mechanism of the mobile device has a concealing design for receiving a larger operation system in a smaller room. Accordingly, various slide cover structures have been developed and widely applied to various mobile devices. In practice, such slide cover structure is suitable for small-size electronic products with small volume, such as mobile phones, handheld game machines and personal digital assistants (PDA). This is because the slide cover has a smaller total area and lighter weight and is not subject to deformation in natural state. Accordingly, no interference or affection between the components will take place in sliding operation.

However, such slide cover mechanism can be hardly applied to a large-size electronic product such as a laptop or a tablet computer with a slidable and liftable screen. Referring to FIG. 1, the electronic product can be a mobile computer having a base seat 9, (which can be a main body of the mobile computer), and a slide cover 90, (which can be a screen). The slide cover 90 has slide mechanisms on two sides for slidably assembling the slide cover 90 on the base seat 9. However, in practice, the slide cover 90 has a larger area and a heavier weight. Therefore, the middle section of the slide cover, (which section is distal from the lateral slide mechanisms), is subject to deformation and downward curvature. When developing and designing the product, a gap 91 is reserved between the slide cover 90 and the base seat 9 to facilitate sliding operation. In case that the middle section of the slide cover 90 is deformed and downward curved, the gap 91 will be minified. Moreover, after a period of use, the external stress will make the deformation more serious. As a result, an interference section 92 may be formed to abrade the base seat 9 or even clog the slide cover 90.

SUMMARY OF THE INVENTION

It is therefore a primary object of the present invention to provide an anti-interference structure of relative slide assembly. During the sliding movement of the slide member along the relative slide member, the gap between the slide member and the relative slide member is enlarged by means of the anti-interference structure so as to avoid interference between the components due to deformation thereof.

To achieve the above and other objects, the anti-interference structure of relative slide assembly of the present invention includes a relative slide member and a slide member relatively slidably assembled and connected with the relative slide member. At least one guide member is disposed on the relative slide member. The guide member has a support section rising from a surface of the relative slide member. At least one raised abutment section is disposed on the slide member and slidable with the slide member. The support section is positioned in the sliding path of the raised abutment section. During the sliding movement of the slide member along the relative slide member, the raised abutment section abuts against the support section to enlarge the gap between the slide member and the relative slide member.

In the above anti-interference structure of relative slide assembly, at least one guide slope is formed on one side of the support section of the guide member.

In the above anti-interference structure of relative slide assembly, at least one receiving section is disposed on the relative slide member and the guide member is connected to the receiving section.

In the above anti-interference structure of relative slide assembly, the receiving section is a channel and the guide member is inlaid in the channel.

The present invention can be best understood through the following description and accompanying drawings, wherein:

DETAILED DESCRIPTION OF THE PREFERRED EMBODIMENTS

Figure 1:
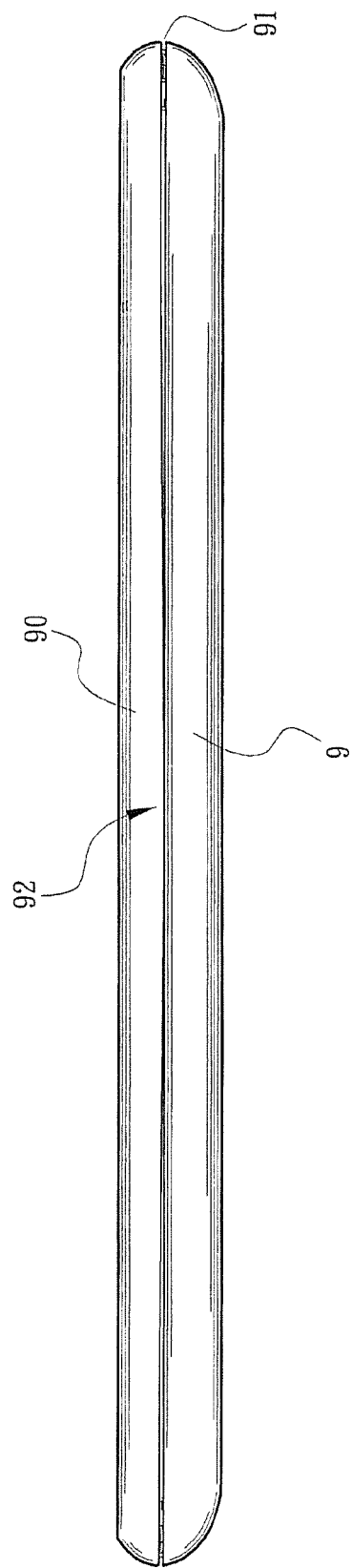
FIG. 1 is a plane view showing the interference between a conventional slide cover and a base seat.
Figure 2:
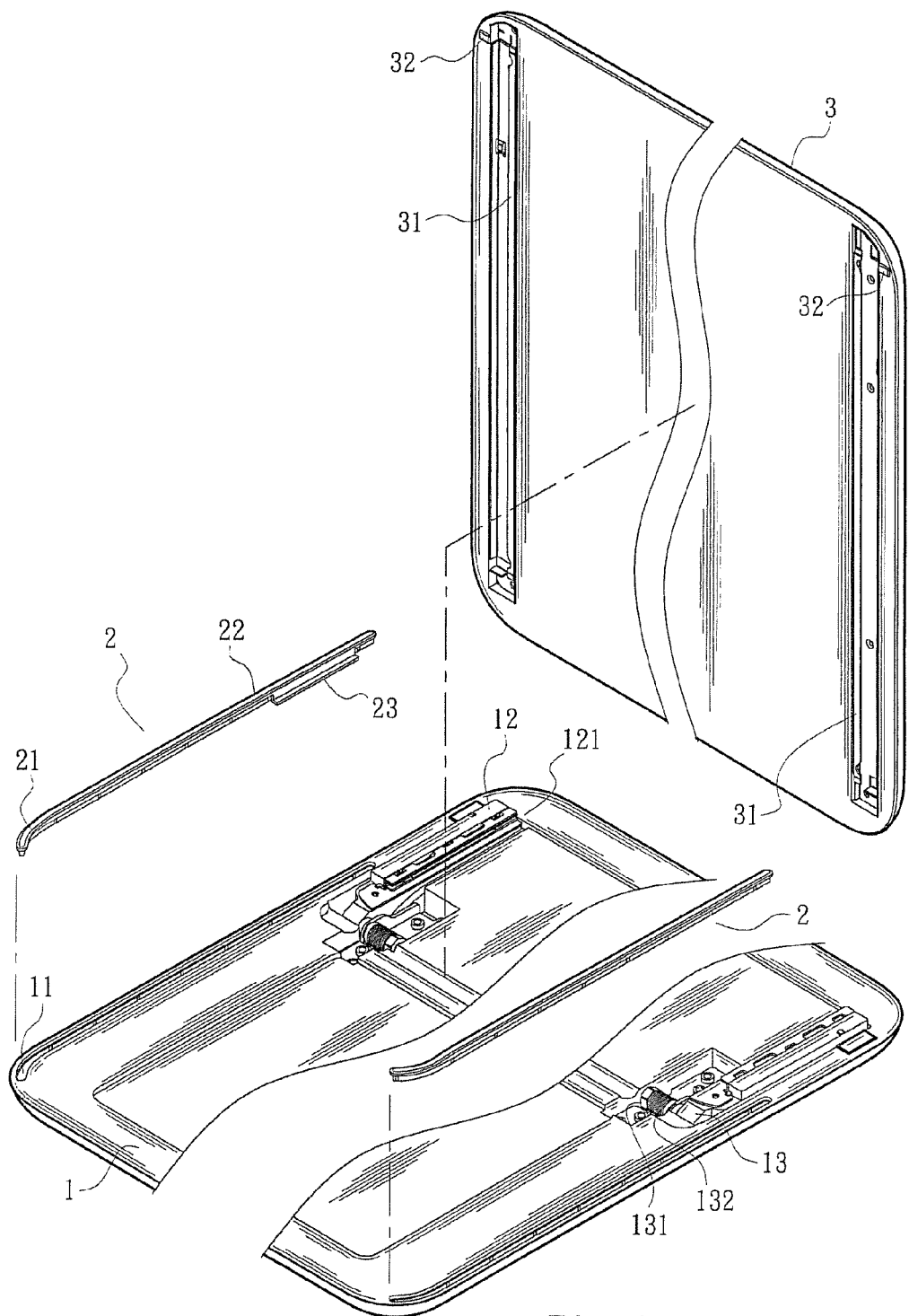
FIG. 2 is a perspective exploded view of the present invention.
Figure 3:
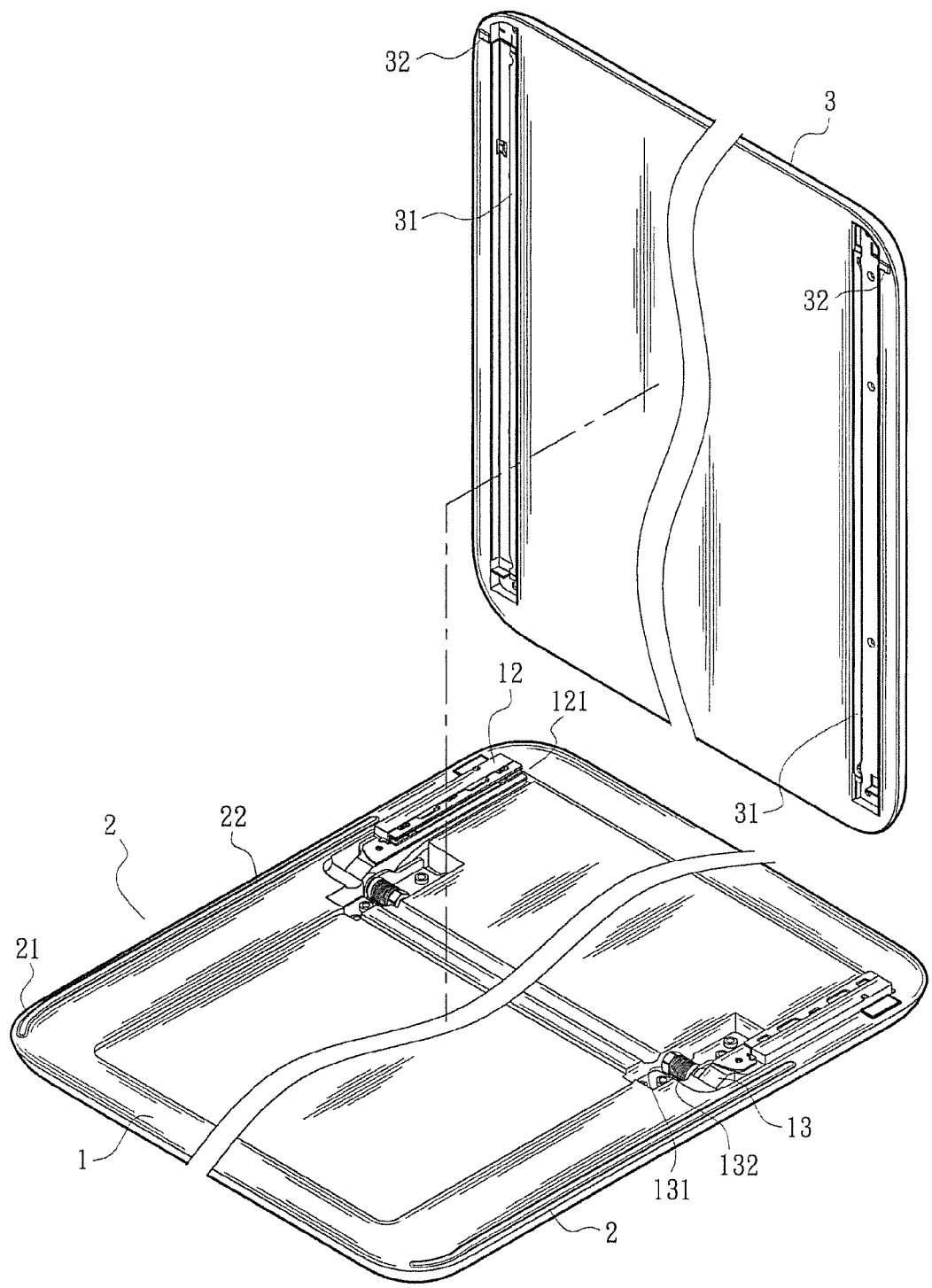
FIG. 3 is a perspective partially exploded view of the present invention.
Figure 4:
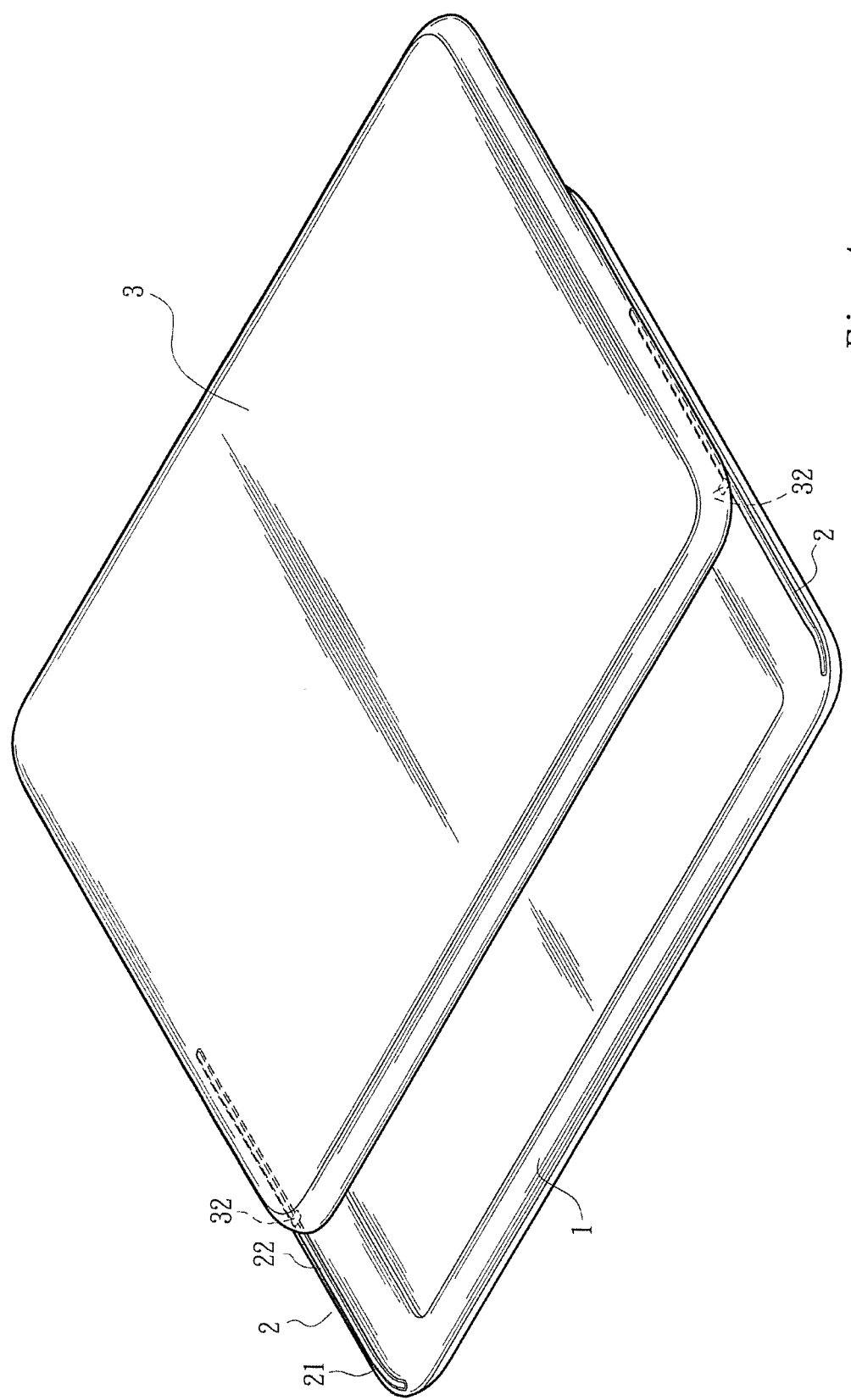
FIG. 4 is a perspective assembled view of the present invention.

Please refer to FIGS. 2 to 4. The present invention includes a relative slide member 1, a guide member 2 and a slide member 3. The relative slide member 1 can be a base seat or a main body of an electronic product. A receiving section 11, (which can be a channel), and a pivot seat 13 are disposed on each of two sides of the relative slide member 1. The pivot seat 13 is pivotally mounted on the relative slide member 1 via a pivot pin 131 and fastened by means of an elastic member 132 (spring). Accordingly, the pivot seat 13 can be located in any angular position relative to the relative slide member 1. A slide seat 12 is additionally connected with the pivot seat 13. A slide channel 121 is disposed on the slide seat 12. The guide member 2 is positioned in the receiving section 11 (channel). A protruding locating section 23 is disposed on at least one side of the guide member 2. The locating section 23 is inlaid and located in the receiving section 11 (channel). A support section 22 is disposed on the guide member 2. The support section 22 rises from the surface of the relative slide member 1. At least one guide slope 21 is formed on one side of the support section 22. The slide member 3 can be a slide cover or a slide member of the electronic product. A slide guide section 31, (which can be a guide rail), and a raised abutment section 32 are disposed on each of two sides of the slide member 3. The slide guide section 31 (guide rail) is slidably positioned in the slide channel 121 of the slide seat 12. During the relative sliding movement of the slide member 3 and the relative slide member 1, the raised abutment section 32 slides in such a path that the raised abutment section 32 can right pass through the guide member 2.

In the above structure, the guide member 2 is detachably connected with the relative slide member 1. Accordingly, after a period of use, the worn out guide member 2 can be replaced with a new one. However, in practice, the guide member 2 can be alternatively integrally formed on the relative slide member 1 to achieve the same effect.

Figure 5:
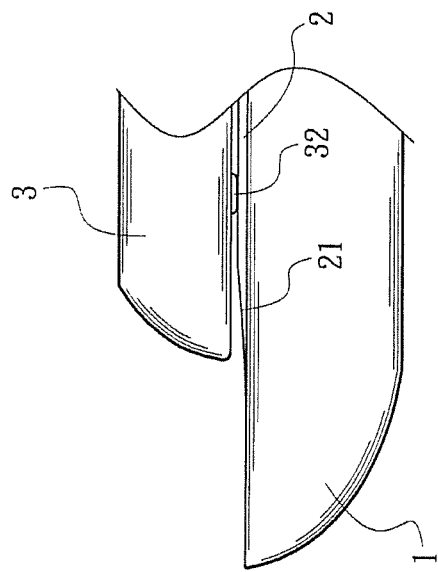
FIG. 5 is an enlarged view showing the position of the raised abutment section of the present invention in a closed state.
Figure 6:
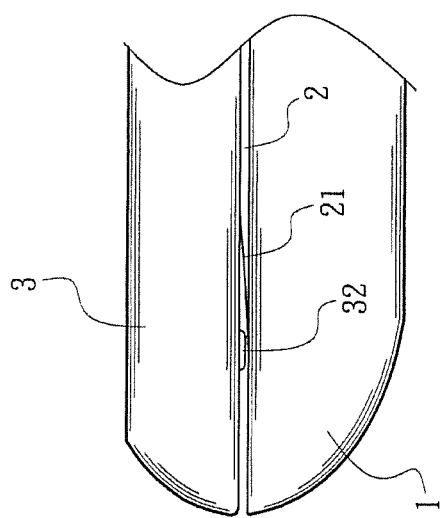
FIG. 6 is an enlarged view according to FIG. 5, showing that the raised abutment section of the present invention slides along the guide member.
Figure 7:
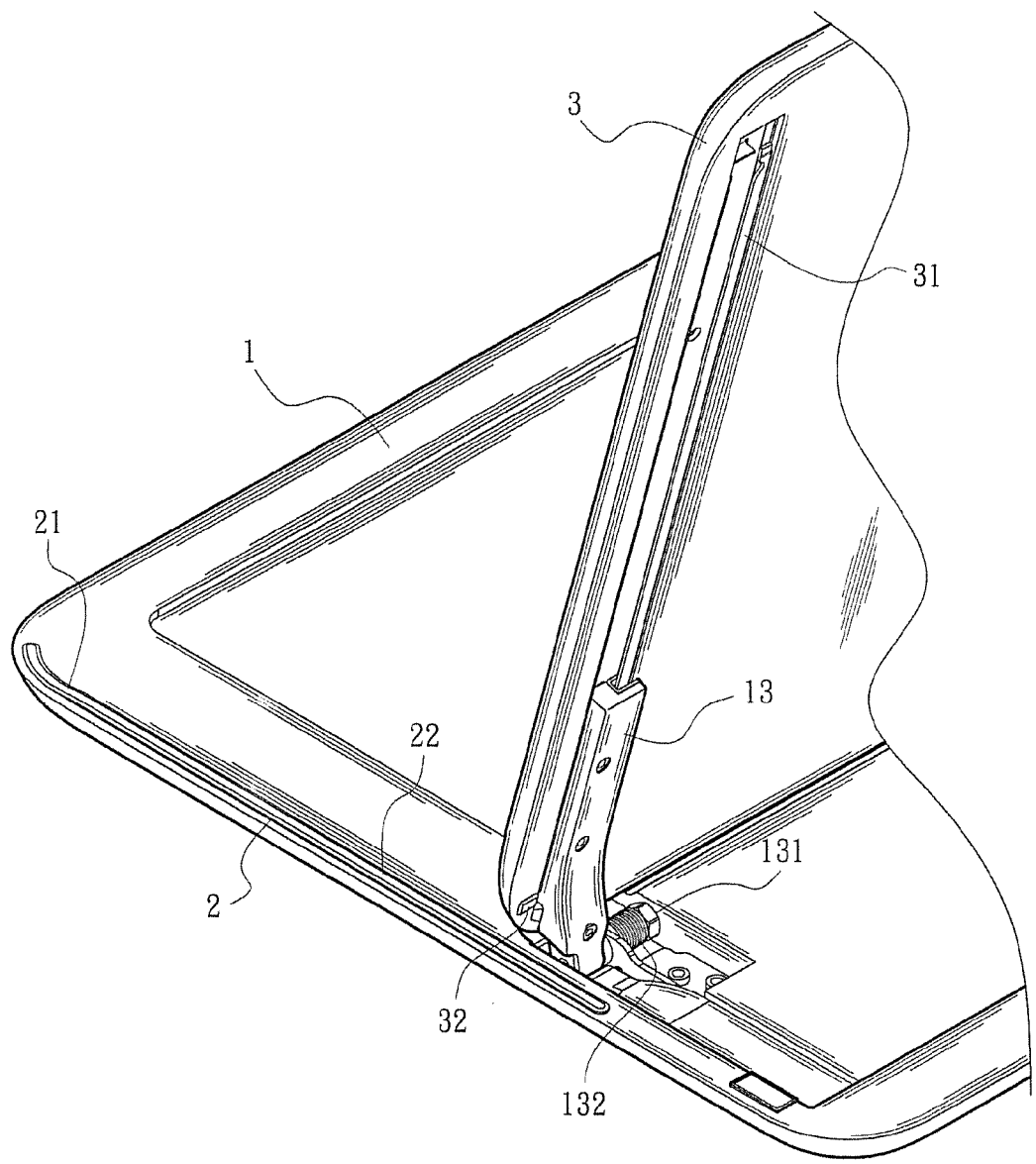
FIG. 7 is a perspective view showing the slide member of the present invention is turned upward.

Please refer to FIGS. 5 to 7. In operation, when the slide member 3 and the relative slide member 1 are in a fully closed state, the raised abutment section 32 of the slide member 3 is positioned in a position outside the guide member 2 (as shown in FIG. 5). When the slide member 3 starts to slide open, the raised abutment section 32 of the slide member 3 is slid along the guide slope 21 onto the support section 22. Accordingly, the gap between the slide member 3 and the relative slide member 1 is enlarged (as shown in FIG. 6). Therefore, in case the slide member 3 or the relative slide member 1 is slightly deformed or curved due to the larger plane face, the enlarged gap between the slide member 3 and the relative slide member 1 can offset the deformation to avoid interference between the slide member 3 and the relative slide member 1 during the sliding movement thereof. After the slide member 3 is slid to a position where the slide member 3 is fully opened, the pivot seat 13 is pivotally rotated to turn the slide member 3 upward. By means of the elastic member 132 (the spring), the pivot pin 131 is fastened to locate the slide member 3 in any angular position (as shown in FIG. 7).

In conclusion, the anti-interference structure of the relative slide assembly of the present invention is truly able to avoid interference between the slide member 3 and the relative slide member 1 during the sliding movement thereof.

The above embodiments are only used to illustrate the present invention, not intended to limit the scope thereof. Many modifications of the above embodiments can be made without departing from the spirit of the present invention.

What is claimed is:

1. An anti-interference structure of relative slide assembly, comprising:
   a guide member disposed on a relative slide member, the guide member having a support section rising from a surface of the relative slide member; and
   a slide member relatively slidably assembled and connected with the relative slide member, at least one raised abutment section being disposed on the slide member and slidable with the slide member, the support section being positioned in at least a part of a sliding path of the raised abutment section, whereby when the raised abutment section abuts against the support section, a gap between the slide member and the relative slide member is enlarged.

2. The anti-interference structure of relative slide assembly as claimed in claim 1, wherein at least one guide slope is formed on one side of the support section of the guide member.

3. The anti-interference structure of relative slide assembly as claimed in claim 2, wherein at least one receiving section is disposed on the relative slide member, the guide member being connected to the receiving section.

4. The anti-interference structure of relative slide assembly as claimed in claim 3, wherein the receiving section is a channel and the guide member is inlaid in the channel.

5. The anti-interference structure of relative slide assembly as claimed in claim 2, wherein the guide member is integrally formed on the relative slide member.

6. The anti-interference structure of relative slide assembly as claimed in claim 1, wherein at least one receiving section is disposed on the relative slide member, the guide member being connected to the receiving section.

7. The anti-interference structure of relative slide assembly as claimed in claim 6, wherein the receiving section is a channel and the guide member is inlaid in the channel.

8. The anti-interference structure of relative slide assembly as claimed in claim 1, wherein the guide member is integrally formed on the relative slide member.

* * * * *